United States Patent [19]

Morita et al.

[11] 4,251,500
[45] Feb. 17, 1981

[54] PROCESS FOR HYDROCRACKING A WASTE RUBBER

[75] Inventors: Minoru Morita, Yonezawa; Tetsuya Takamatsu, Kokubunji, both of Japan

[73] Assignee: Bridgestone Tire Company Limited, Tokyo, Japan

[21] Appl. No.: 952,514

[22] Filed: Oct. 18, 1978

[30] Foreign Application Priority Data

Oct. 20, 1977 [JP] Japan .................. 52/125088

[51] Int. Cl.³ .................. C01B 31/02; C09C 1/48; C01B 31/00
[52] U.S. Cl. .................. 423/449; 423/445; 585/241
[58] Field of Search ............ 423/445, 449, 450, 460, 423/461, 453; 260/683 PD; 585/241

[56] References Cited

U.S. PATENT DOCUMENTS

| | | | |
|---|---|---|---|
| 1,882,813 | 10/1932 | Haag | 423/453 |
| 2,760,847 | 8/1956 | Oblad et al. | 423/453 |
| 3,340,011 | 9/1967 | Hoekstra et al. | 423/453 |
| 3,639,445 | 2/1972 | Breuer et al. | 585/241 |
| 3,704,108 | 11/1972 | Alpert | 423/461 |
| 3,823,224 | 7/1974 | Laman et al. | 423/460 |
| 3,996,022 | 12/1976 | Larsen | 423/453 |

FOREIGN PATENT DOCUMENTS 607233  8/1948  United Kingdom .............. 585/241

Primary Examiner—O. R. Vertiz
Assistant Examiner—Gregory A. Heller
Attorney, Agent, or Firm—Jordan and Hamburg

[57] ABSTRACT

This invention relates to a process for hydrocracking a waste rubber such as used tires, used conveyor belts, used hoses etc., and more particularly to a process for hydrocracking such waste rubber with a specific catalyst obtained by mixing (1) a main catalyst of an iron compound with (2) an auxiliary catalyst of metal compounds of the Periodic Table, Group VI, based on a synergistic catalyst action with sulfur contained in said waste rubber so that said waste rubber is decomposed into an oil contents and carbon.

3 Claims, No Drawings

PROCESS FOR HYDROCRACKING A WASTE RUBBER

This invention relates to a process for hydrocracking a waste rubber such as used tires, used conveyor belts, used hoses, etc., and more particularly to a process for hydrocracking a crushed waste rubber with a specific catalyst by heating at a high temperature so that said waste rubber is cracked into an oil contents, carbon and gases.

Recently the amount of waste rubber products such as used tires, etc. has increased, and their disposal is a serious environmental problem. Processes for crushing the waste rubber product to powder for utilizing said powder in various industrial materials, or processes for utilizing thermally cracked products have been studied for effectively utilizing said waste rubber products. Especially, resource saving is now inevitable owing to the decrease in petroleum resources in the world, and thus the thermal cracking of waste rubber to obtain an oil therefrom has been regarded as important, and many researches and developments have been made for such thermal cracking. However, the products obtained by such thermal cracking contains considerable sulfur, and thus have been used only as a low grade fuel.

On the other hand, an oil containing not more than 0.5% by weight of sulfur is obtained by hydrocracking, and thus application not only as a clean fuel but also as various organic solvents or chemical raw materials can be expected for the hydrocracking products. Furthermore, carbon usually contained in an amount of 30 to 40% by weight in the tire can be separated as solid matter.

Research on utilizing waste rubber by hydrocracking at a high temperature under a high pressure has been conducted for a long time, and is disclosed, for example, in British Pat. No. 577,472, Japanese Pat. Nos. 175,582 and 175,814 and further U.S. Pat. Nos. 2,693,461 and 2,833,749, etc., but all of these are directed to treating an unvulcanized rubber. U.S. Pat. No. 3,704,108 which is directed to treating a vulcanized rubber is also known, but is based on use of a catalyst of Co or Ni molybdate (alumina carrier), and thus the invention disclosed in said specification is different from the present invention, and the activity of said catalyst was not necessarily satisfactory.

As a result of extensive studies of such processes for hydrocracking a rubber, the present inventors have succeeded in obtaining an oil consisting mainly of aromatic and naphthenic hydrocarbons of good quality and carbon by adding a powdery catalyst obtained by mixing (1) a main catalyst of iron compound and (2) an auxiliary catalyst of metal compounds of the Periodic Table, Group VI so that the crushed waste rubber mixed therewith is hydrocracked at a temperature of 350° to 500° C. under a hydrogen partial pressure of 100 to 300 atm. based on a synergistic catalyst action with sulfur contained in said waste rubber.

According to the present invention, the crushed waste rubber can be hydrocracked without adding a pasting oil thereto. However, the hydrocracking can be more efficiently carried out by mixing the crushed waste rubber with a pasting oil such as a hydrogenated heavy oil, etc. to make a slurry containing 20 to 50% of solid matter, or by swelling the waste rubber in the pasting oil and crushing the swelled waste rubber to make a slurry before adding the powdery mixed catalyst to said waste rubber. Then, the powdery mixed catalyst comprising the main catalyst of iron compound and the auxiliary catalyst of metal compound of the Periodic Table, Group VI is added to the crushed waste rubber, and reaction is carried out in a reactor at a temperature of 350° to 500° C. for 5 to 30 minutes while blowing hydrogen therein so that the hydrogen partial pressure in the system may be 100 to 300 atm., whereby an oil and carbon are obtained together with generation of a small amount of gas. After the completion of the reaction, the products are taken out from the reactor, and the an oil and the carbon can be readily separated from each other by filtration while being heated. Furthermore, the carbon is washed with a small amount of a solvent such as benzene, etc.; thereby the powdery carbon free from organic matter on surface can be obtained. The powdery catalyst of iron compound filtered off at the same time can be readily separated from the carbon by air sieve method, etc. owing to a difference in specific gravity therebetween. Zinc white (zinc sulfide), silica, calcium carbonate, etc. contained in the waste rubber as a filler are filtered off as a mixture with the carbon powder, but can be used together with the carbon because of the small quantity thereof. Chemical additives for rubber or softeners such as a vulcanization accelerator, antioxidant, etc. contained in the waste rubber are partially decomposed by the hydrogenation at elevated temperatures, or are dissolved in the oil and then separated therefrom. The chemical additives for rubber have no adverse effect upon the utilization of the oily product because of the small blending proportion thereof.

The oil can be fractionated into a fraction having a boiling point of less than 300° C. and a hydrogenated heavy oil having a boiling point of 300° C. or higher by distillation, and a portion of the hydrogenated heavy oil can be utilized again in the reaction as the pasting oil. As the pasting oil, a fraction having a boiling point of 300° C. or higher, obtained by hydrogenating anthracene oil having no crystals therein, creosote oil or crude naphthalene oil can also be utilized. 10 to 15% by weight of the crushed waste rubber is converted to a gas which is comprised of lower hydrocarbons such as methane, ethane, etc., hydrogen sulfide, ammonia etc.

The powdery mixed catalyst of the present invention comprises the main catalyst of iron compound capable of principally promoting a hydrocracking reaction at a high temperature, and the auxiliary catalyst of metal compounds of Periodic Table, Group VI which seems to principally promote dehydrogenation-cyclization of aliphatic hydrocarbons and a low temperature hydrocracking reaction. The iron compound for the main catalyst is preferably iron hydroxide, iron oxide, bog iron ore, red mud, etc., and the metal of the Periodic Table, Group VI, for the auxiliary catalyst is preferably di-valent or tri-valent acid or oxide of, for example, Cr, Mo, W, Se, or Te. Those catalysts can be used alone or as a mixture, and the main catalyst and the auxiliary catalyst can be added separately to the crushed waste rubber. Admixing ratio of said main catalyst and said auxiliary catalyst is 1:0.1 to 0.75 based on the molar ratio of the metal, and the activity is increased by the presence of sulfur. 0.1 to 5% by weight, preferably 0.5 to 1.5% by weight of the powdery mixed catalyst is used on the basis of the crushed waste rubber. The reaction rate is low in the case of less than 0.1% by weight, whereas the reaction rate is not increased in the case of more than 5% by weight, though the reaction is not inhibited.

In the present invention, the temperature of the reaction system is 350° to 500° C., preferably 420° to 460° C. In the case of reaction temperatures lower than 350° C., it is difficult to separate the oil and the carbon, whereas in the case of the use of higher than 500° C., formation of gas and coke becomes excessive.

In the present invention, a hydrogen partial pressure of 100 to 300 atm. is utilized, but it is recognized that a higher pressure within this range is preferable since an increase of the proportion of oil is thereby attained attained. In the case of a pressure less than 100 atm., it is difficult to separate the carbon from the oil, whereas too high pressure makes the process economically disadvantageous.

In the present invention, the crushed waste rubber is used as the raw material, and the workability is improved, if the waste rubber is crushed into fine powder.

In the present invention, the reaction is satisfactorily carried out within 5 to 30 minutes. In the case of a longer reaction time, the gasification becomes unexpectedly more vigorous.

The special features of the present invention are as follows:

(1) The waste rubber, particularly used tires, is mainly classified into two groups on the basis of treatment, that is, tires for truck and bus, consisting mainly of natural rubber, and small tires for passenger car and light truck, consisting mainly of styrene-butadiene synthetic rubber. The used tires for truck and bus have been mostly reused as a reclaimed rubber, but the used small tires now forming a proportion of more than 60% to the whole of the used tires have had no effective reuse, and their utilization is a serious problem. The present invention is particularly effective for treating such small tires, and has a great significance as a process for utilizing the used small tires and providing a high added value.

(2) Usually, 1.0 to 3.0% by weight of sulfur is contained in the crushed waste rubber, but such sulfur does not act as a catalyst poison in the present invention. Generally, the catalytic activity of the hydrogenating catalyst may be decreased by the presence of sulfur, but the sulfur in the vulcanized rubber product is the essential component for vulcanization, and its prior removal is impossible. Thus, it is desirable that such sulfur does not influence the activity of the catalyst. In the case of the present powdery mixed catalyst resulting from the study of these points, the sulfur does not act as a catalyst poison, and can considerably increase catalytic activity at a temperature range of from 350° to 500° C. As a result, the reaction proceeds in such a very short time as 5 to 30 minutes. Thus, the present invention has a high efficiency in treating the waste rubber and is industrially very useful.

(3) At the ordinary hydrogenating temperature without any catalyst or even in the presence of a catalyst, it is very difficult to separate the oil and the carbon, and a large amount of solvent is necessary for the purification of the carbon and thus the operation is complicated. However, in the present invention, the separation of the coexisting carbon by filtration can be improved by increasing the aromatic and naphthenic hydrocarbon components of the oil.

(4) The method for measuring an amount of carbon gel formed is available as a method for evaluating the reinforcing capability of carbon black for rubber. According to said method, it is found that the finely crushed carbon powder obtained according to the present invention can form a carbon gel in a degree almost equal to that obtained by the commercially available carbon black, and can be used as a reinforcing agent for rubber.

(5) The waste rubber, particularly used tires, contains cords comprised of polyamide or polyester as one of the tire constituents, but in the present invention, these cords are decomposed to aromatic and naphthenic hydrocarbons of low molecular weight, and never act as a reaction-inhibiting factor. When the used tires are crushed, various apparatuses have been required for removing these cord wastes and also much labor was required and then the crushing cost became high. The process according to the present invention is economically advantageous since the removal of the cord waste is not necessary.

The present invention shall be explained more in detail referring to the below described examples.

EXAMPLE 1

400 g of crushed used tire of 4 to 20 mesh consisting mainly of styrene-butadiene rubber was admixed with 600 g of hydrogenated heavy oil having a boiling point of 300° C. or higher as a pasting oil to make a slurry, and further admixed to said slurry were 4 g of iron hydroxide, 0.8 g of molybdenic acid (hydrate) and 0.8 g of chromium oxide. The resulting mixture was subjected to reaction in an autoclave for 15 minutes, while charging hydrogen therein under an initial pressure of 100 atm. and a maximum pressure of 190 atm., and while elevating the temperature thereof up to 440° C. at a rate of 3° C./minute. The resulting product could be readily separated into the carbon and oil by filtration. The carbon was washed with a small amount of benzene, whereby 165 g of purified carbon were obtained. The recovered 210 g of oil were fractionated by distillation into 7% by weight of a fraction boiling at less than 150° C., 45% by weight of a fraction boiling at 150° to 250° C., and 48% by weight of a fraction boiling at 250° to 300° C. Furthermore, the hydrogenated heavy oil having the boiling point of 300° C. or higher initially added as the pasting oil could be recovered. The produced gas was mainly hydrogen sulfide, and lower hydrocarbons such as methane, ethane, etc., and 15% by weight of the used tires was thus gasified.

EXAMPLE 2

400 g of crushed used tire of 4 to 20 mesh consisting mainly of styrene-butadiene rubber containing 15% by weight of cords of polyamide synthetic fiber were admixed with 600 g of hydrogenated heavy oil having a boiling point of 300° C. or higher to make a slurry, and further admixed to said slurry were 4 g of iron hydroxide, 0.8 g of molybdenum trioxide and 0.8 g of chromium oxide. The resulting mixture was subjected to reaction for 15 minutes in an autoclave under an initial pressure of hydrogen of 100 atm. and a maximum pressure of 183 atm., while elevating the temperature up to 450° C. at a rate of 3° C./minute. The resulting product could be readily separated into oil and carbon by filtration. The carbon was washed with a small amount of benzene, whereby 155 g of purified carbon were obtained. The recovered 195 g of oil were fractionated by distillation into 12% by weight of a fraction having a boiling point of less than 150° C., 40% by weight of a fraction having a boiling range of 150° to 250° C., and 44% by weight of a fraction having a boiling range of 250° to 300° C. Furthermore, the hydrogenated heavy oil having a boiling point of 300° C. or higher could be recovered. In the reaction the produced gas was hydrogen sulfide, ammonia and lower hydrocarbons such as methane, ethane, etc., and 20% by weight of the used tire was thus gasified.

What is claimed is:

1. A process for hydrocracking a waste rubber characterized by adding 0.1 to 5% by weight of a powdery catalyst, based on the weight of said rubber, obtained by mixing (1) a main catalyst of iron compound selected from the group consisting of iron hydroxide, iron oxide, bog iron and red mud with (2) an auxiliary catalyst of compounds of the Periodic Table, Group VI metals selected from the group consisting of the di-and trivalent oxides and acids of Cr, Mo, W, Se and Te, the ratio of said main catalyst and said auxiliary catalyst of said powdery catalyst being 1:01 to 1:0.75 based on the molar ratio of the metal components thereof, to crushed waste rubber, heating the resultant mixture at a temperature of 350° to 500° C. under a hydrogen partial pressure of 100 to 300 atm. so that said crushed waste rubber is hydrocracked based on a synergistic catalyst action with the sulfur contained in said waste rubber, and recovering carbon and an oil inclusive of aromatic and naphthenic hydrocarbons.

2. A process for hydrocracking a waste rubber according to claim 1, wherein the amount of said powdery catalyst added to said crushed waste rubber is 0.5 to 1.5% by weight, based on the weight of said rubber.

3. A process for hydrocracking a waste rubber according to claim 1, wherein the reaction temperature is 420° to 460° C.

* * * * *